UNITED STATES PATENT OFFICE 2,148,103

PREPARATION OF ISOPHORONES

Herman A. Bruson, Philadelphia, Pa., assignor to Röhm & Haas Company, Philadelphia, Pa.

No Drawing. Application March 17, 1938, Serial No. 196,388

8 Claims. (Cl. 260—586)

This invention relates to a process for preparing higher isophorones, particularly isophorones containing from 15 carbon atoms upwards in the molecule.

Isophorones, as well as homo-isophorones, have been obtained from lower aliphatic ketones, particularly acetone, methyl ethyl ketone, and diethyl ketone, by reaction with sodium amide or sodium ethylate in the cold. The yields have been poor and the processes tedious and expensive. Diacetone alcohol, mesityl oxide, or phorone and their homologues corresponding to methyl ethyl ketone or diethyl ketone, have invariably been obtained as undesirable by-products. According to Ekeley and Howe (Jour. Amer. Chem. Society 45, 1922 (1923)), methyl ethyl ketone, upon standing at room temperature with sodium ethylate for three to four weeks, yields a mixture containing, among other materials, two isophorones. From 800 grams of methyl ethyl ketone they isolated 75 grams of one isophorone and 34 grams of another. Similarly, Ekeley and Carpenter (Jour. Amer. Chem. Soc. 46, 448 (1924)) treated diethyl ketone at 10° C. for twelve days with sodium ethylate, and obtained 5 grams of the isophorone derivative from 220 grams of the ketone. Poor results were also obtained by Freund and Speyer (Berichte der Deutschen Chem. Ges. 35, 2322 (1902)), who working according to German Patent No. 134,982 (1902) reacted one kilogram of acetone with sodamide in the cold and obtained 55 grams of isophorone. Still poorer results are described by Frank and Kohler (Liebig's Annalen der Chemie, 433, 314 (1923)) who treated various ketones in the cold with caustic alkalies. It is thus obvious that isophorones are not readily obtained by the intercondensation of ketones according to previously known methods.

It has now been found that saturated aliphatic ketones containing a methyl group directly attached to the carbonyl group and at least one hydrogen atom on the α-carbon atom of the other alkyl group, and which contain from five carbon atoms upwards, condense readily and smoothly to isophorones, containing three times as many carbon atoms, when heated with alkali metal oxides, hydroxides, amides or alkoxides, at temperatures above 100° C., so as to split out water, preferably under conditions whereby the water which is evolved is continuously removed as fast as it is formed. It is not essential to remove the water as fast as it is formed but, if it is left in the reaction mixture, the temperature will necessarily be lower, the reaction will proceed more slowly, and the yields of the isophorones will not be so high. The reactions are completed in a few hours at temperatures from 150° C. to 200° C. Inert organic liquids can be used to assist in carrying off the water formed; toluene, xylene, tetralin, cymene, or petroleum naphtha (B. P. 150° to 200° C.) being useful for this purpose. The yields of pure isophorones obtained are of the order of 50% to 85% of theory, based upon the ketone employed.

New isophorones having from 15 to about 57 carbon atoms in the molecule are easily obtainable by the present process from aliphatic methyl ketones, having 5 to 19 carbon atoms inclusive in the molecule. These are valuable intermediates for the preparation of industrial products. For example, upon catalytic hydrogenation in the presence of active, finely divided nickel, they yield the corresponding higher polyalkyl cyclohexanols, which are useful as plasticizers, or which can be esterified with organic monobasic or polybasic acids to give substances useful as plasticizers and softening agents for resins or textiles. These higher polyalkyl cyclohexanols, upon treatment with sulfonating agents, or with excess of ethylene oxide or higher alkylene oxides, or in the form of their water-soluble xanthates yield water-soluble bodies having capillary-active properties which are useful as wetting, emulsifying, and penetrating agents.

The ketones which may be used according to the present invention have the general formula

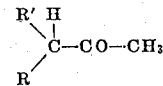

in which R is a saturated alkyl group and R' is hydrogen or a saturated alkyl group, the total number of carbon atoms in R and R' being from 2 to 16 inclusive.

As representative of the numerous alkyl methyl ketones which can be employed in the present process to yield isophorones containing at least 15 carbon atoms, the following members are typical:

Methyl-n-propyl ketone, methyl-isopropyl ketone, methyl-n-butyl ketone, methyl-isobutyl ketone, methyl-n-amyl ketone, methyl-n-hexyl ketone, methyl-n-nonyl ketone, methyl-n-undecyl ketone, 5-ethyl-nonanone-2, methyl-n-hexadecyl ketone, methyl ketones from the oxidation of secondary alcohols from the methanol synthesis having five or more carbon atoms in the molecule, and analogous saturated straight- or branched-chain alkyl mono-ketones containing a methyl group next to the —CO— group and at least one hydrogen atom on the α-carbon atom of the other alkyl group, and possessing at least five carbon atoms.

The isophorones obtained from the above ketones are pale yellow, or almost colorless oils of high boiling point, the higher members of which cannot be distilled even in vacuo without decomposition.

In practicing this invention, the ketone is mixed with the solid alkaline catalyst (alkali metal oxide, hydroxide, amide or alcoholate), and heated with stirring at from about 130° C. to about 200° C., under a reflux condenser attached to a water trap. A suitable inert solvent can be used, if desired, to assist in carrying off the water. Although the oxides, hydroxides, amides or alkoxides of sodium, lithium, or potassium may be used, it has been found that potassium hydroxide is the most efficient and economical. In general, from 0.25 to 0.50 mol of the alkali catalyst per mol of the ketone gives good results. However, this quantity is not to be construed as limiting, since a larger or smaller quantity can be used.

The following examples will illustrate this invention which, however, is not limited to the exact materials, times, temperatures, etc., shown as it may otherwise be practiced within the scope of the appended claims.

Example 1

A mixture consisting of 128 g. of methyl-n-hexyl ketone (1 mol) and 28 g. of potassium hydroxide (pellets) was stirred and heated under a reflux condenser attached to a water trap. The potassium hydroxide dissolved as the temperature gradually rose during a 3-hour heating period from 140° to 215° C. At the end of this time, no more water came over, and the potassium hydroxide had separated out. The product was filtered free from solid alkali, washed with dilute hydrochloric acid, and then with water, and fractionally distilled in vacuo. After the unchanged methyl-hexyl ketone had come over, 85 g. of a pale yellow oil, boiling at 203°–205° C./4 mm., was collected. This product, upon redistillation, boiled sharply at 202° C./4 mm., and possessed the following constants: Formula $$C_{24}H_{44}O, N_D^{25°}=1.4726$$

Sp. Gr. at 25° 0.8764.

The yield obtained in this case is about 73% of the theoretical. If, instead of removing the water as fast as it is formed, the water is allowed to remain in the reaction mixture, the yield will be reduced to about 60%.

The isophorone obtained from methyl hexyl ketone as described above was hydrogenated using Rainey nickel as the catalyst at 175° C. and 2000 lbs. per square inch pressure. It was converted to the corresponding substituted cyclohexanol which was a colorless, viscous liquid boiling at 212°–215° C./3 mm., having a specific gravity of $$0.8723 \text{ and } N_D^{25°}=1.4660$$

Example 2

A mixture consisting of 114 g. of methyl-n-amyl ketone and 28 g. of potassium hydroxide pellets was rapidly stirred and heated under reflux, so that the water evolved was separated in a water trap and unchanged ketone ran back into the reaction mixture. The temperature gradually rose during a 3-hour heating period from 168° to 200° C., after which no more water was evolved. The product was cooled, washed with dilute hydrochloric acid, and then thoroughly with water, and fractionated in vacuo.

The desired product came over at 178°–181° C./4 mm. as a pale yellow oil. Yield 80 g. It possessed the following constants: Formula

$$C_{21}H_{38}O, N_D^{25°}=1.4769,$$

Sp. Gr. at 25° 0.8893.

Example 3

A mixture consisting of 100 g. of methyl isobutyl ketone and 28 g. of potassium hydroxide was boiled under reflux attached to water trap for six hours at 155°–200° C., until evolution of water ceased. The product was filtered and the filtrate washed first with dilute hydrochloric acid and then with water. The washed oil, upon distillation in vacuo, yielded 58 g. of product boiling at 135°–142° C./4 mm. Upon redistillation, it boiled at 135°–137° C./4 mm. It possessed the following constants: Formula

$$C_{18}H_{32}O, N_D^{25°}=1.4718,$$

Sp. Gr. at 25° 0.8764.

Example 4

(a) A mixture consisting of 128 g. of methyl-n-hexyl ketone, 28 g. of potassium hydroxide, and 100 g. of dry toluene was stirred rapidly and boiled under reflux attached to a water separator for five hours at 130° C. The product was filtered and the filtrate washed and distilled. The product, boiling at 203°–205° C./4 mm., was collected. Yield—100 g. or 83% of theory.

(b) The same product was obtained in 51% yield by boiling 128 g. of methyl-n-hexyl ketone with 34 g. of sodium ethylate for six and one-half hours at 176° C.

Example 5

A mixture consisting of 86 g. of methyl-n-propyl ketone (technical product, B. P. 99° to 104° C., containing some methyl-isopropyl ketone) and 28 g. of potassium hydroxide was boiled while stirring rapidly under a reflux condenser attached to a water trap. The temperature gradually rose during a 5-hour period from 110° C. to 190° C. as the water was evolved. The product was filtered, washed, and fractionated in vacuo. Obtained 45 g. of almost colorless oil, B. P. 127°–131° C./2 mm., having the formula C$_{15}$H$_{26}$O. The isophorone from pure methyl-n-propyl ketone boiled at 130°–131° C./3 mm. Sp. Gr. at 25° 0.9089;

$$N_D^{25°}=1.4790$$

Example 6

A mixture, consisting of 42.5 g. of 5-ethyl-nonanone-2 (technical "undecanone"), 50 g. of xylene, and 7 g. of potassium hydroxide, was boiled for five and one-half hours while stirring under a reflux condenser attached to a water trap. The temperature during the condensation was 140° to 144° C. When no more water collected in the water trap, the product was washed and distilled in vacuo. The fraction boiling at 260°–280° C./4 mm. was collected and redistilled. Yield 30 g. It boiled at 245°–250° C./3 mm., and had the empirical formula C$_{33}$H$_{62}$O. It was a yellow oil.

Example 7

A mixture, consisting of 56 g. of methyl-n-heptadecyl ketone, 55 g. of xylene, and 5 g. of potassium hydroxide, was boiled under reflux while stirring continuously for five hours. The un-

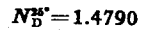

changed ketone was distilled off in high vacuo up to 250° C./1 mm. The residual oil, weighing 40 g., was decolorized with bleaching clay. It consisted essentially of the ketone $C_{57}H_{110}O$.

*Example 8*

A mixture, consisting of 128 g. of methyl-n-hexyl ketone and 19.5 g. of sodamide, was stirred for three hours until evolution of ammonia ceased. During this time the temperature rose spontaneously from room temperature (30° C.) to 60° C. The mixture was then boiled under reflux for four and one-half hours during which time the temperature rose to 195° to 230° C. and the water which evolved was collected in a water trap. The cooled, filtered, and washed product was distilled in vacuo, yielding 86 g. or a 73% yield of the $C_{24}$-isophorone boiling at 200°–205° C./4 mm. described in Example 1.

I have found that ketones which lack a $CH_3$— group next to the —CO— group do not form isophorones when heated, as described herein, with caustic alkalies. For instance, diethyl ketone, di-n-propyl ketone, diiso-propyl ketone, diisobutyl ketone form only traces, if any, of the isophorones by the present process. Furthermore, other alkalies, such as the oxides or hydroxides of calcium, barium, magnesium, zinc, and lead, were entirely inoperative.

I claim:

1. A process for preparing isophorones containing at least fifteen carbon atoms which comprises heating a saturated alkyl mono-ketone having a methyl group directly attached to the carbonyl group and at least one hydrogen atom attached to the α-carbon atom of the other alkyl group, and containing at least five carbon atoms in the molecule, with a member of the group consisting of an oxide, hydroxide, amide and alkoxide of an alkali metal at a temperature above 100° C., so as to split out water.

2. A process for preparing isophorones containing at least fifteen carbon atoms which comprises heating a saturated alkyl mono-ketone having a methyl group directly attached to the carbonyl group and at least one hydrogen atom attached to the α-carbon atom of the other alkyl group, and containing at least five carbon atoms in the molecule, with a member of the group consisting of an oxide, hydroxide, amide and alkoxide of an alkali metal, at a temperature above 100° C., so as to split out water, and continuously removing the water as fast as it is formed.

3. A process for preparing isophorones containing from 15 to 57 carbon atoms inclusive, which comprises heating a member of the group consisting of an oxide, hydroxide, amide and alkoxide of an alkali metal with an aliphatic ketone, of the formula

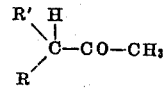

in which R is an alkyl radical and R' is a member of the group consisting of hydrogen and alkyl radicals, the total number of carbon atoms in R and R' being from 2 to 16 inclusive, at a temperature above 100° C. so as to split out water.

4. A process for preparing isophorones containing at least fifteen carbon atoms which comprises heating a saturated alkyl mono-ketone having a methyl group directly attached to the carbonyl group and at least one hydrogen atom attached to the α-carbon atom of the alkyl group, and containing at least five carbon atoms in the molecule, with potassium hydroxide at a temperature above 100° C. so as to split off water.

5. An isophorone containing from 15 to 57 carbon atoms, inclusive, derived from the inter-condensation of three molecules of a ketone, of the formula

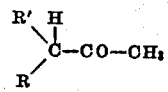

in which R is an alkyl radical and R' is a member of the group consisting of hydrogen and alkyl radicals, the total number of carbon atoms in R and R' being from 2 to 16 inclusive.

6. The ketone $C_{24}H_{44}O$, derived from the intercondensation of three molecules of methyl-n-hexyl ketone.

7. The ketone $C_{18}H_{32}O$, derived from the intercondensation of three molecules of methyl-isobutyl ketone.

8. The ketone $C_{15}H_{26}O$, derived from the intercondensation of three molecules of methyl-n-propyl ketone.

HERMAN A. BRUSON.